United States Patent
Kienle et al.

(10) Patent No.: US 9,884,396 B2
(45) Date of Patent: Feb. 6, 2018

(54) MOTOR SPINDLE

(71) Applicant: GROB-WERKE GmbH & Co. KG, Mindelheim (DE)

(72) Inventors: Anton Kienle, Salgen (DE); Johann Müller, Kammlach (DE); Armin Reiter, Bad Wörishofen (DE)

(73) Assignee: GROB-WERKE GmbH & Co. KG, Mindelheim (DE)

( * ) Notice: Subject to any disclaimer, the term of this patent is extended or adjusted under 35 U.S.C. 154(b) by 761 days.

(21) Appl. No.: 14/288,990

(22) Filed: May 28, 2014

(65) Prior Publication Data

US 2014/0352997 A1    Dec. 4, 2014

(30) Foreign Application Priority Data

May 29, 2013   (DE) .................. 10 2013 105 565

(51) Int. Cl.
*B23Q 5/04* (2006.01)
*E21B 23/00* (2006.01)
(Continued)

(52) U.S. Cl.
CPC ............ *B23Q 5/04* (2013.01); *B23Q 1/0009* (2013.01); *B23Q 1/0018* (2013.01);
(Continued)

(58) Field of Classification Search
CPC .. B23Q 1/0009; B23Q 1/0036; B23Q 1/5406; B23Q 11/00; B23Q 1/0018;
(Continued)

(56) References Cited

U.S. PATENT DOCUMENTS 2,291,071 A  *  7/1942  Bruno ................. H01R 39/00
                                              174/21 JR
4,145,802 A  *  3/1979  d'Auria ............... B23P 19/102
                                              29/26 A
(Continued)

FOREIGN PATENT DOCUMENTS

DE        19532976 A1     3/1997
DE        10062307 A1     7/2002
(Continued)

OTHER PUBLICATIONS

Notice of Preliminary Rejection in Korean Application No. 10-2014-0063469 dated Feb. 26, 2016 (13 pages).
(Continued)

*Primary Examiner* — Scott A. Smith
(74) *Attorney, Agent, or Firm* — Goodwin Procter LLP

(57) ABSTRACT

The invention relates to a motor spindle comprising at least one spindle drive which can be supplied with energy and/or operating supplies via at least one feed line. This motor spindle has a fixedly installed first coupling element of a multi-coupling, to the ports of which the feed lines for transmitting energy and/or operating supplies are connected. The invention also relates to a machine tool comprising such a motor spindle, wherein the machine tool has a second coupling element of the multi-coupling. On this second coupling element, the respective complementary ports for transmitting energy and/or operating supplies are arranged.

18 Claims, 2 Drawing Sheets

(51) Int. Cl.
  *B23Q 1/00* (2006.01)
  *B23Q 1/70* (2006.01)
  *B23Q 5/06* (2006.01)
  B25J 15/04 (2006.01)
  B23Q 11/00 (2006.01)

(52) U.S. Cl.
  CPC ......... *B23Q 1/0036* (2013.01); *B23Q 1/0063* (2013.01); *B23Q 1/70* (2013.01); *B23Q 5/043* (2013.01); *B23Q 5/06* (2013.01); *E21B 23/00* (2013.01); *B23Q 11/00* (2013.01); *B23Q 2220/006* (2013.01); *B25J 15/04* (2013.01); *Y10S 483/901* (2013.01); *Y10T 29/5107* (2015.01); *Y10T 409/309296* (2015.01)

(58) Field of Classification Search
  CPC .......... B23Q 1/0063; B23Q 1/54; B23Q 1/25; B23Q 5/04; B23B 15/00; E21B 7/30; E21B 7/205; E21B 19/086; E21B 21/00; E21B 23/00; B25J 15/04; Y10S 279/90; Y10S 483/901; Y10T 29/5107; Y10T 409/309296
  USPC ......... 173/213, 218, 221, 132, 29, 217, 168, 173/169; 409/201, 211, 230, 231; 405/154, 184; 279/4.01, 4.06, 75, 900; 403/11; 483/901
  See application file for complete search history.

(56) References Cited

U.S. PATENT DOCUMENTS

| | | | |
|---|---|---|---|
| 4,635,328 A | | 1/1987 | Palmer |
| 4,636,135 A | * | 1/1987 | Bancon ................ B25J 15/0491 29/26 A |
| 4,664,588 A | * | 5/1987 | Newell ................ B23Q 1/0063 294/86.4 |
| 4,676,142 A | * | 6/1987 | McCormick ....... B23Q 3/15553 279/4.06 |
| 4,793,053 A | * | 12/1988 | Zuccaro ................... B25J 15/04 279/4.01 |
| 5,205,671 A | * | 4/1993 | Handford .................. E21B 7/30 175/62 |
| 5,779,609 A | * | 7/1998 | Cullen ................... B23K 9/287 219/98 |
| 5,954,446 A | * | 9/1999 | Ireland ..................... B23K 9/32 403/11 |
| 6,402,443 B1 | * | 6/2002 | Hoppe ................. B23Q 1/0009 408/56 |
| 6,491,612 B1 | * | 12/2002 | Kurup ..................... B23K 9/20 285/268 |
| 6,554,551 B1 | * | 4/2003 | Marelli ................ B23Q 1/0009 409/201 |
| 6,763,566 B1 | | 7/2004 | Hassler |

FOREIGN PATENT DOCUMENTS

| | | |
|---|---|---|
| DE | 102008007293 A1 | 8/2008 |
| DE | 102011075405 B3 | 8/2012 |
| DE | 202012007020 U1 | 1/2013 |
| EP | 1092499 A2 | 4/2001 |
| EP | 1609549 B1 | 12/2005 |

OTHER PUBLICATIONS

Extended European Search Report (with translation) in European Application No. 14 169 747.4 (5 pages).
German Search Report for German Patent Application No. 10 2013 105 565.6 dated Mar. 14, 2014 (5 pages).

\* cited by examiner

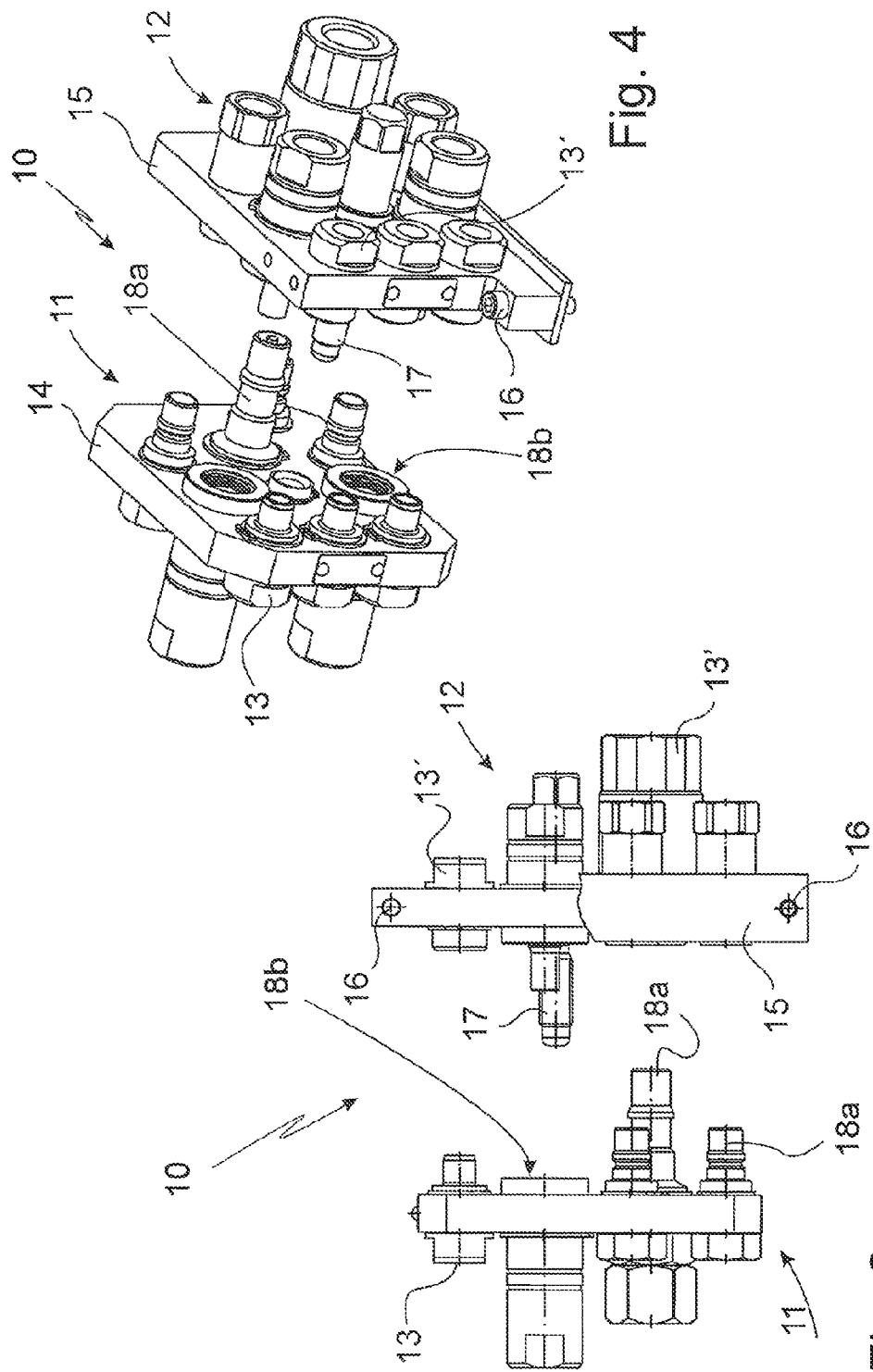

MOTOR SPINDLE

CROSS-REFERENCE TO RELATED APPLICATIONS

This application is a filing of German Patent Application No. 10 2013 105 565.6, filed May 29, 2013, which is hereby incorporated by reference in its entirety.

BACKGROUND

The invention relates to a motor spindle comprising at least one spindle drive that can be supplied with energy and/or operating supplies via at least one feed line, and to a machine tool comprising such a motor spindle.

SUMMARY

Motor spindles carrying a tool are typically used in boring, grinding and milling machines; motor spindles carrying the workpiece are more likely to be found in turning machines. Besides the drive and the bearing of the shaft, the tool interface is one of the most important components of a modern motor spindle. The tool is changed automatically and fixed by a clamping system. Thus, the motor spindle is regarded today as the central subassembly of a machine tool and is responsible to a substantial degree for the performance and accuracy of the machine tool. Due to the complex structure and the interaction of the individual components, motor spindles are not a standard product, but are developed and produced according to individual requirements. Accordingly, there is the demand to be able to use, depending on the specific work order, different motor spindles on one and the same machine tool. The main fields of use for such motor spindles are machining centers and CNC machine tools from the sectors of turning, grinding and milling machines, HSC (high speed cutting), HPC (high performance cutting), tool and mold making, as well as the automotive production.

It is an object of the present invention to improve the interchangeability of a motor spindle on a machine tool.

This object is achieved by a motor spindle according to the invention, comprising at least one spindle drive which can be supplied with energy and/or operating supplies via at least one feed line, and comprising a multi-coupling with a first and second coupling element and wherein a fixedly installed first coupling element of a multi-coupling, to the ports of which the feed lines for transmitting energy and/or operating supplies are connected is installed at a motor spindle or spindle drive and wherein a second coupling element of the multi-coupling on which the respective complementary ports for transmitting energy and/or operating supplies are arranged is installed at a machine tool.

A substantial point of the motor spindle according to the invention is the particularly simple coupling of all required feed lines that can be connected to one another (and also disconnected) in a single work step. This results in a motor spindle that can be handled particularly well and that can also be interchanged in a particularly simple manner for work order or maintenance reasons. Since all required feed lines are connected together, this also results in a particularly safe and reliable system. Moreover, a motor spindle having such a fixedly installed first coupling element of a multi-coupling can be produced in a particularly simple and cost-effective manner. At the same time, the usually demanded precision of such a motor spindle remains unaffected.

In the motor spindle according of the invention it is provided that the first coupling element is fixedly installed on a rear side of the motor spindle, in particular on the motor spindle housing or a separate support of the motor spindle. In this way, in particular damage to the coupling elements at the spindle are excluded and a plug-and-play solution is created that enables a particularly simple assembly or a particularly simple exchange of the motor spindle on the machine tool.

The aforementioned object is also achieved by a machine tool according to the invention that comprises such a motor spindle, wherein the machine tool has a second coupling element of the multi-coupling, on which second coupling element the respective complementary ports for transmitting energy and/or operating supplies are arranged.

A substantial point of the machine tool according to the invention is that, according to the requirements, it can receive different motor spindles without requiring extensive assembly and installation work. Hence, this machine tool can be utilized in a very flexible and efficient manner, and thus can be used for machining different workpieces. Since the ports are designed for transmitting all kinds of media, in addition, reliable and secure supply of energy and/or operating supplies to all kinds of motor spindles is ensured.

Lesser changeover effort when changing the motor spindle is an advantage not only when changing the type of motor spindle, for example, because a motor spindle is required that provides different parameters (speed, clamping range of the tool, etc.). Also, in the case of failure of the motor spindle, the proposal according to the invention reduces the downtimes significantly since the motor spindle configured according to the invention can be assembled and disassembled considerably faster, and the machine tool according to the invention is therefore available again more rapidly for machining tasks.

In an embodiment of the motor spindle it is provided that the first and/or second coupling element has a plate-shaped support element from which the ports extend perpendicularly. In this manner, particularly simple mounting and also attaching the complementary ports without jamming is ensured, wherein moreover, the ports can be arranged in a high connection density and thus allow a particularly small and compact construction. Overall, this results in a particularly easy handling of the motor spindle during maintenance or exchange of said motor spindle.

In a second preferred embodiment of the motor spindle according to the invention or the machine tool according to the invention it is provided that the ports are formed for transmitting drive medium and/or coolant and/or lubricant, or are connected or can be connected to air lines, for example, for blowing air or sealing air.

In a further preferred embodiment of the motor spindle according to the invention or the machine tool according to the invention it is provided that the complementary ports are formed as a respective plug connector and socket combination. This results in a particularly high connecting security between the two coupling elements, which contributes to a particularly reliable operation of the maintained or replaced motor spindle.

In another preferred embodiment of the motor spindle according to the invention or the machine tool according to the invention it is provided that the plug connectors of a respective plug connector and socket combination are arranged on the first coupling element. The first coupling element and therefore the coupling element at the spindle thus can be attached to the machine tool in a particularly simple manner, which makes exchanging the motor spindle particularly easy.

In another preferred embodiment of the motor spindle according to the invention or the machine tool according to the invention it is provided that the sockets of a respective plug connector and socket combination are arranged on the second coupling element. The second coupling element and thus the coupling element at the machine tool is therefore less subjected to damage to the plug connectors on this coupling element, which damage could affect the operational capability of the machine tool itself.

Therefore, in both aforementioned cases of a respective plug connector and socket combination on the first and on the second coupling element, respectively, high operational capability and reliability of both the motor spindle and the machine tool and, of course, the combination of both is ensured.

In another advantageous embodiment of the motor spindle according to the invention or the machine tool according to the invention it is provided that the first coupling element comprises plug connectors and also sockets that are connected to the respective ports for carrying energy and/or operating supplies. In an appropriate mixture of plug connectors and sockets on the first coupling element, thus the coupling element at the spindle, a particularly reliable guidance is ensured when the motor spindle is attached to the machine tool.

In another preferred embodiment of the motor spindle according to the invention or the machine tool according to the invention s provided that the first and/or the second coupling element has at least one fastening element tier detachably connecting these coupling elements to a another component, in particular to a carrier plate. Said fastening element can be configured here as a clip connection or screw connection or can consist of the carrier plate itself, which allows guided coupling and adjusting both coupling elements with respect to one another. This results in particularly good handling properties of the connection which, furthermore, also guarantees a particularly reliable and secure connection.

In another preferred embodiment of the motor spindle according to the invention or the machine tool according to the invention it is provided that the at least one fastening element is arranged in an edge region of the first and/or second coupling element. This ensures in particular a space-saving mounting of this fastening element, which does not affect the connection density of the corresponding coupling elements.

In another preferred embodiment of the motor spindle according to the invention or the machine tool according to the invention it is provided that the first and/or the second coupling element has at least one fastening element for detachably connecting both coupling elements. In this way, in particular, no further component is required that would have to be provided for fixing both coupling elements to one another, as a result of which fastening the coupling elements to one another can be implemented in a particularly simple and cost-effective manner. Moreover, a high degree of safety and reliability is established by means of the simple structural design of this connection.

In another preferred embodiment of the motor spindle according to the invention or the machine tool according to the invention it is provided that the at least one fastening element for detachably connecting the first and/or second coupling element is integrated in at least one port. This results in a fastening possibility that is even more space-saving and that can in particular be implemented in that at least some ports are provided with a suitable clip lock and/or screw lock through which it is easily manageable to interlock complementary ports and/or to screw them together.

In another advantageous embodiment of the motor spindle according to the invention or the machine tool according to the invention it is provided that the at least one fastening element is formed as a bolt and nut connection on the first and the second coupling elements. This kind of fastening is a particularly simple fixation of the two coupling elements with respect to one another, which fixation can be designed as a flange-like screw connection, for example. Due to the simple accessibility of the bolt and nut connection, furthermore, good handling properties of the motor spindle according to the invention on the machine tool are achieved.

In another preferred embodiment of the motor spindle according to the invention or the machine tool according to the invention it is provided that the bolt and nut connection is arranged approximately in the center of the first and/or the second coupling element. Such a centrally arranged connection is particularly reliable since uniform force distribution over all complementary ports of both coupling elements is ensured.

In another preferred embodiment of the motor spindle according to the invention or the machine tool according to the invention it is provided that the second coupling element is connected or can be connected to the feed line of an energy chain of the machine tool. The second coupling element, thus the one at the machine, is therefore freely movable which makes changing the motor spindle particularly simpler.

In another preferred embodiment of the motor spindle according to the invention or the machine tool according to the invention it is provided that the first coupling element is fixedly installed to an otherwise freely movable feed line. This too enables a particularly simple mounting or a particularly simple exchange of the motor spindle on the machine tool since the first coupling element, thus the one at the spindle, is freely movable similar to a plug on a cable.

In another preferred embodiment of the machine tool according to the invention it is provided that the second coupling element is fixedly installed on a separate support of the machine tool. This too results in a mounting as damage-free as possible of the second coupling element, thus the one at the machine, which likewise can be utilized in the form of a plug-and-play solution.

In another preferred embodiment of the machine tool according to the invention it is provided that for receiving the motor spindle on the machine tool, at least one slide-in rail is provided, wherein by sliding in the motor spindle on the slide-in rail, the two coupling elements also connect conductively for supplying energy and/or operating supplies. Through this, rack-like guiding of the motor spindle on the slide-in rail is possible, which excludes potential damage to complementary ports caused by tilting of the motor spindle with respect to the machine tool so that appropriate handling of the motor spindle during replacement or maintenance, and also its reliable connection to the machine tool are ensured.

DESCRIPTION OF DRAWINGS

The drawing schematically illustrates the invention in particular in an exemplary embodiment. In the figures:

FIG. 3 shows a side view of the first and the second coupling elements of the multi-coupling of FIGS. 1 and 2, and FIG. 4 shows a perspective top view diagonally from above onto the second coupling element of the multi-coupling of FIG. 3.

In the Figures, elements that are identical or correspond to each other are designated by the same reference numbers and, if not useful, are not described again.

DETAILED DESCRIPTION

Figure 1:
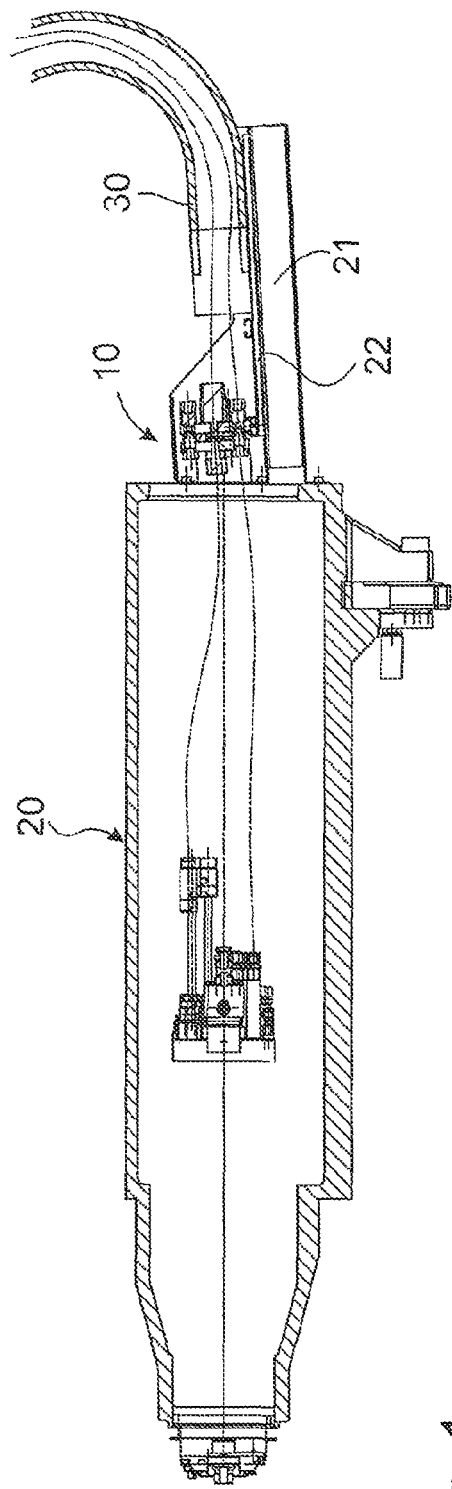
FIG. 1 shows a longitudinal sectional side view of a motor spindle with a spindle drive according to the invention, which motor spindle is connected to the machine tool via a multi-coupling and an energy chain.

FIG. 1 shows a longitudinal sectional side view of a motor spindle 20 according to the invention with a spindle drive, which motor spindle is connected to a machine tool (not shown) via a multi-coupling 10 and an energy chain 30. Connected to the motor spindle 20 is a carrier plate 21 that carries a slide-in rail 22 on which the energy chain 30 and the multi-coupling 10 can be displaced relative to one another. The multi-coupling 10 itself is arranged at the left end of the slide-in rail 22 and establishes a connection between feed lines at the machine tool for transmitting energy and/or operating supplies to the motor spindle 20, the transmission path thereof is illustrated here with dashed lines.

Figure 2:
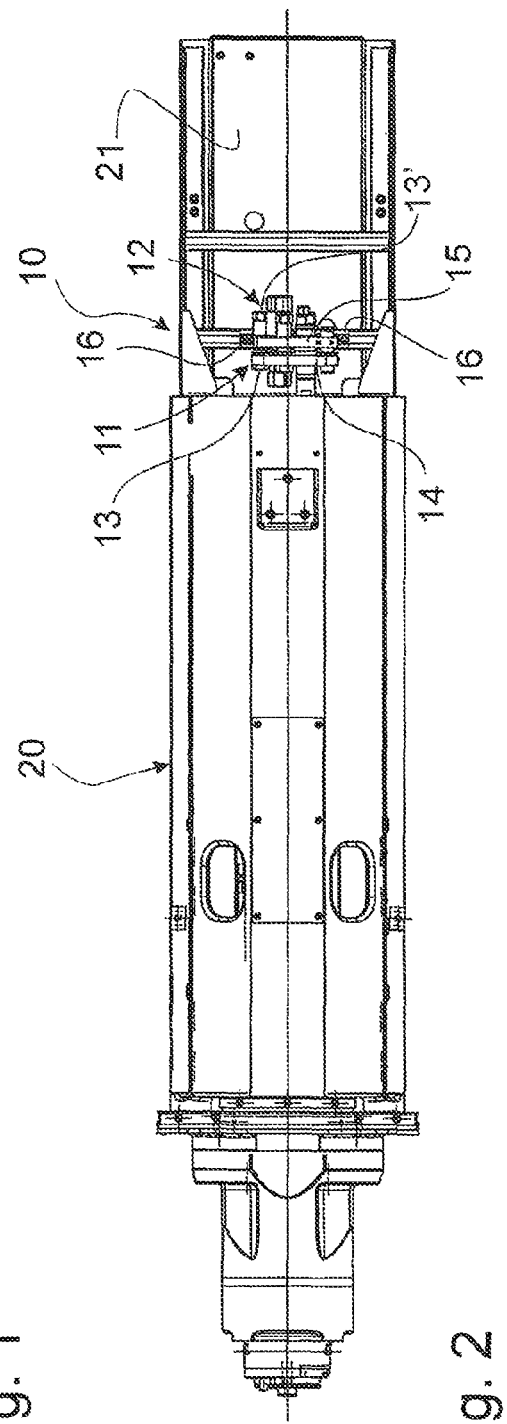
FIG. 2 shows a top view onto the motor spindle of FIG. 1 in a slightly enlarged scale, with a closed housing and an exposed multi-coupling.

FIG. 2 shows a top view onto the motor spindle 20 of FIG. 1 in a slightly enlarged scale with a closed housing and an exposed multi-coupling 10, the first and second coupling elements 11, 12 of which are connected to one another via complementary ports 13, 13' for energy and/or operating supplies. Through these ports 13, 13' (for clarity reasons, only one complementary pair of plug connectors and sockets is designated by these reference numerals), energy and/or operating supplies, which, for example, comprise power supply, lubricant and cooling water supply, blowing air or sealing air supply etc., are made available at the machine tool to the motor spindle. All ports 13, 13' are arranged opposite one another on corresponding support elements 14, 15, whereby a high connection density of the ports 13, 13' on the multi-coupling 10 is enabled. In the edge region of the support element 15 at the machine tool, fastening elements 16 from the coupling element 12 to the carrier plate 21 are provided.

FIG. 3 shows a side view of the first and second coupling elements 11, 12 of the multi-coupling 10 of the FIGS. 1 and 2, which can be detachably connected to one another via a corresponding fastening element 17 which is formed here as a screw that is fitted centrally to the support element 15 at the machine tool. By tightening this screw in a thread provided complementary thereto in the support element 14, all energy ports and/or operating supply ports 13, 13' are uniformly pulled towards one another and are securely and reliably connected to one another. On the coupling element 11 at the spindle, the ports 13 are formed as plug connectors 18a and also as sockets 18b, with corresponding complementary counterparts being arranged the coupling element 12. This ensures particularly good guidance for both coupling elements 11, 12 when changing or replacing the motor spindle 20. The fastening elements 16 on the coupling element 12 at the machine tool are arranged in the edge region of the support element 15 and are designed as corresponding holes for receiving fastening screws. Through this, a high level of integration density of the ports 13' on the support element 15 remains ensured while, at the same time, the coupling element 12 at the machine tool is in a defined position.

FIG. 4 shows a perspective top view diagonally from above onto the coupling elements 11, 12 of the multi-coupling 10 of the FIG. 3. This Figure clearly shows in particular the high number of ports 13, 13' on both support elements 14, 15, which allow for extensive supply from the machine tool to the motor spindle 20. Through the fastening element 17 at the machine tool, the two coupling elements 11, 12 can be connected to one another in a simple manner so that a secure and reliable supply of energy and/or operating supplies is ensured through the ports 13, 13'. By means of the fastening elements 16, the support element 15 at the machine tool is fastened to the carrier plate 21 via screws so as to provide a defined position and stability of this support element 15 with respect the support element 14 of the motor spindle 20 if the latter, for example, has to be removed or exchanged for maintenance or work-order-related reasons. This improves overall the handling properties of the motor spindle 20 without limiting its usually desired functionality.

Although the invention has been illustrated and described here in above with respect to the presently preferred practice, it will be understood by those skilled in the art that modifications and variations may be made to the described embodiments without deporting from the spirit and scope of the invention.

The invention claimed is:

1. A motor spindle for use with a machine tool, the motor spindle comprising:
   at least one spindle drive that can be supplied with at least one of energy and operating supplies via at least one feed line and connectable to the machine tool via a multi-coupling comprising:
      a first coupling element comprising a plurality of ports, each port of which is detachably connectable to one of the at least one feed line, for transmitting at least one of energy and operating supplies; and
      a second coupling element detachably and fixedly connectable to the first coupling element and detachably connectable to the machine tool and comprising a plurality of respective complementary ports for transmitting at least one of energy and operating supplies,
      wherein the first coupling element has a plate-shaped support element from which the plurality of ports extends perpendicularly and the second coupling element has a plate-shaped support element from which the plurality of respective complementary ports extends perpendicularly, and
      the plate-shaped support element of the first coupling element has at least one first fastening element and the plate-shaped support element of the second coupling element has at least one corresponding second fastening element for detachably and fixedly connecting plate-shaped support element of the first coupling element to the plate-shaped support element of the second coupling element.

2. The motor spindle according to claim 1, wherein each port of the plurality of respective complementary ports is formed as a combination of a plug-connector and a socket.

3. The motor spindle according to claim 2, wherein the plug connector is arranged on the first coupling element and the socket is arranged on the second coupling element.

4. The motor spindle according to claim 1, wherein the first coupling element comprises a plurality of plug connectors and a plurality of sockets which are connected to respective ports.

5. The motor spindle according to claim 4, wherein the first coupling element is fixedly installed to a substantially freely movable feed line.

6. The motor spindle according to claim 5, wherein the first coupling element is fixedly installed to the feed line on at least one of a motor spindle housing and a separate support of the motor spindle.

7. The motor spindle according to claim 4, wherein at least one of the first coupling element and the second coupling element has at least one fastening element for detachably connecting the coupling element to another component.

8. The motor spindle according to claim 7, wherein the component is a carrier plate.

9. The motor spindle according to claim 1, wherein the first fastening element and the corresponding second fastening element are arranged in an edge region of at least one of the first coupling element and the second coupling element.

10. The motor spindle according to claim 1, wherein, for detachably connecting the first coupling element and the second coupling, each of the first and corresponding second fastening elements is integrated in at least one port.

11. The motor spindle according to claim 1, wherein the first coupling element is fixedly installed on a rear side of the motor spindle.

12. The motor spindle according to claim 1, wherein at least one of the plurality of ports and the plurality of respective complementary ports is adapted for transmitting a medium selected from the group consisting of a drive medium, a coolant, a lubricant, and air.

13. The motor spindle according to claim 1, wherein the first fastening element and the corresponding second fastening element are formed as a bolt and nut connection on the first coupling element and the second coupling element, respectively.

14. The motor spindle according to claim 13, wherein the bolt and nut connection is arranged approximately in center portions of each of the first coupling element and the second coupling element.

15. The motor spindle according to claim 14, wherein the second coupling element is detachably connectable to the feed line of an energy chain of the machine tool.

16. A machine tool having a motor spindle comprising at least one spindle drive that can be supplied with at least one of energy and operating supplies via at least one feed line and detachably connectable to a multi-coupling comprising:
   a first coupling element comprising a plurality of ports, each of which is detachably connectable to one of the at least one feed line, for transmitting at least one of energy and operating supplies, and
   a second coupling element detachably and fixedly connectable to the first coupling element and comprising a plurality of respective complementary ports for transmitting at least one of energy and operating supplies,
   wherein the first coupling element is fixedly installed on a rear side of the motor spindle and the second coupling element is fixedly installed on a separate support of the machine tool, and
   wherein the first coupling element has a plate-shaped support element from which the plurality of ports extends perpendicularly and the second coupling element has a plate-shaped support element from which the plurality of respective complementary ports extends perpendicularly, and
   the plate-shaped support element of the first coupling element has at least one first fastening element and the plate-shaped support element of the second coupling element has at least one corresponding second fastening element for detachably and fixedly connecting plate-shaped support element of the first coupling element to the plate-shaped support element of the second coupling element.

17. The machine tool according to claim 16 further comprising at least one slide-in rail for receiving the motor spindle on the machine tool.

18. The machine tool according to claim 17, wherein by sliding in the motor spindle on the slide-in rail, the first coupling element connects conductively to the second coupling element for supplying at least one of energy and operating supplies.

* * * * *